US010253841B2

(12) United States Patent
Lee et al.

(10) Patent No.: US 10,253,841 B2
(45) Date of Patent: Apr. 9, 2019

(54) METHOD FOR CALCULATING OPTIMAL CONTROL FORCE OF ACTIVE MASS DAMPER AND CONTROLLING ACTIVE MASS DAMPER

(71) Applicant: INDUSTRY-ACADEMIC COOPERATION FOUNDATION, DANKOOK UNIVERSITY, Gyeonggi-do (KR)

(72) Inventors: Sang Hyun Lee, Gyeonggi-do (KR); Sung Sik Woo, Gyeonggi-do (KR); Lan Chung, Seoul (KR)

(73) Assignee: INDUSTRY-ACADEMIC COOPERATION FOUNDATION, DANKOOK UNIVERSITY, Yongin-si, Gyeonggi-Do (KR)

( * ) Notice: Subject to any disclaimer, the term of this patent is extended or adjusted under 35 U.S.C. 154(b) by 119 days.

(21) Appl. No.: 15/037,309

(22) PCT Filed: Oct. 16, 2014

(86) PCT No.: PCT/KR2014/009727
§ 371 (c)(1),
(2) Date: May 17, 2016

(87) PCT Pub. No.: WO2016/017856
PCT Pub. Date: Feb. 4, 2016

(65) Prior Publication Data
US 2017/0130802 A1    May 11, 2017

(30) Foreign Application Priority Data

Jul. 29, 2014  (KR) ........................ 10-2014-0096795

(51) Int. Cl.
*G05B 21/00* (2006.01)
*G01M 1/38* (2006.01)
(Continued)

(52) U.S. Cl.
CPC .......... *F16F 15/002* (2013.01); *F16F 7/1011* (2013.01); *G05B 13/041* (2013.01);
(Continued)

(58) Field of Classification Search
CPC ...... F16F 13/005; F16F 15/002; F16F 7/1011; F16F 15/005; F16F 15/02; F16F 15/0275;
(Continued)

(56) References Cited

U.S. PATENT DOCUMENTS 4,924,640 A * 5/1990 Suizu ...................... E02D 31/08
52/1
4,935,838 A * 6/1990 Barger .................... F16F 15/02
361/148
(Continued)

FOREIGN PATENT DOCUMENTS

JP    2008-225526 A    9/2008
KR    10-1390502 B1    4/2014

OTHER PUBLICATIONS

Chung et al., "Experiments on Active Control of Seismic Structures," *Journal of Engineering Mechanics* 114:241-256, 1988.
(Continued)

*Primary Examiner* — Thomas C Lee
*Assistant Examiner* — Zhipeng Wang
(74) *Attorney, Agent, or Firm* — Seed IP Law Group LLP

(57) ABSTRACT

The present invention relates to a method for calculating optimal control force of an active mass damper and controlling the active mass damper, which is used for vibration control of a structure, the method comprising: (a) sensing frequency and an acceleration response generated in a structure in real time by a sensor, wherein the frequency and the acceleration response are structural responses; (b) calculating velocity and displacement of the active mass damper by integrating the acceleration response by an
(Continued)

integral calculation module; (c) calculating the optimal control force using a weighting function and a zero point calibration signal according to the calculated velocity, the calculated displacement, and the calculated displacement, by a control force calculation module; and (d) controlling driving of an actuator according to the calculated optimal control force. Accordingly, the method/system for calculating optimal control force of an active mass damper and controlling the active mass damper according to the present invention can control a flow phenomenon of a moving mass body by a weighting function and a zero point calibration signal, enable stable control at a zero point, and remove signals other than those in a control mode through a band pass filter, thereby accurately generating a control signal and achieving performance which can satisfy a control target for each mode.

12 Claims, 15 Drawing Sheets

(51) Int. Cl.

| | |
|---|---|
| *G05B 13/00* | (2006.01) |
| *G05B 15/00* | (2006.01) |
| *G05D 23/00* | (2006.01) |
| *F16F 15/00* | (2006.01) |
| *G05D 19/02* | (2006.01) |
| *G05B 13/04* | (2006.01) |
| *G06F 17/11* | (2006.01) |
| *F16F 7/10* | (2006.01) |
| *F16F 13/00* | (2006.01) |

(52) U.S. Cl.
CPC ............ *G05D 19/02* (2013.01); *G06F 17/11* (2013.01); *F16F 13/005* (2013.01)

(58) Field of Classification Search
CPC ....... G05B 13/04; G05B 13/041; G06F 17/11; B63B 39/005; B64G 1/22; B66C 13/066; E02D 31/08; E04B 1/985; G05D 19/02; H01L 41/08
See application file for complete search history.

(56) References Cited

U.S. PATENT DOCUMENTS

| | | | | |
|---|---|---|---|---|
| 5,544,452 | A * | 8/1996 | Fujita ................. | E04B 1/985 52/167.1 |
| 2009/0248209 | A1* | 10/2009 | Breitbach ............ | F16F 15/002 700/280 |
| 2009/0294234 | A1* | 12/2009 | Kashani .............. | F16F 15/0275 188/379 |
| 2013/0085617 | A1* | 4/2013 | Ladra .................. | F16F 15/002 700/280 |
| 2013/0211630 | A1* | 8/2013 | Storm .................. | B06B 1/0603 701/3 |
| 2015/0361658 | A1* | 12/2015 | Yamashina .......... | F16F 7/1005 52/1 |

OTHER PUBLICATIONS

Chung et al., "Experimental Study of Active Control for MDOF Seismic Structures," *Journal of Engineering Mechanics* 115(8):1609-1627, 1989.
Gattuli et al., "Nonlinear Control Laws for Enhancement of Structural Control Effectiveness," *Proceedings of the Fifth U.S. National Conference on Earthquake Engineering, Earthquake Engineering Research Institute* 1:971-975, 1994, 7 pages.
Hong et al., "Across-Wind Response Control of a Building Structure using an Active Mass Damper—focused in the practical application to Technomart 21," *The Wind Engineering Institute of Korea* 17(1):15-25, 2013. (English Abstract Only).
Min et al., "Comparative Study on Active Control Algorithms through Weighting Functions," *Collected Papers of Computational Structural Engineering Institute of Korea* 14(2):173-179, 2001. (English Abstract Only).
Tamura et al., "Control Gain Scheduling of a Hybris Mass Damper System Against Wind Response of a Tall Building," *Proceedings of the First World Conference on Structural Control* 3(1):FA2-13-FA2-22, 1994, 12 pages.

* cited by examiner

Weighting function ($G_2$)

Zero point calibration signal ($G_2$)

Non-application

Application $G_1$: On, $G_2$: Off $G_1$: On, $G_2$: On

Low pass filter

High pass filter

METHOD FOR CALCULATING OPTIMAL CONTROL FORCE OF ACTIVE MASS DAMPER AND CONTROLLING ACTIVE MASS DAMPER

TECHNICAL FIELD

The present invention relates to controlling vibrations generated in a structure and, more particularly, to a method for calculating optimal control force of an active mass damper used for controlling vibrations of a structure, and controlling the active mass damper.

BACKGROUND OF THE DISCLOSURE

Use of mass-type vibration control apparatuses, which are technologies for reducing vibrations of a structure or a bridge resulting from a wind load, has been increased. A mass-type vibration control apparatus corresponds to a method for increasing vibrations through resonance by tuning dynamic characteristics of the apparatus itself to an additional vibrometer having mass in response to a vibration response of a structure, and controlling vibrations of the structure through the increased vibrations. Such a mass-type vibration control apparatus is mostly installed in a position where the response of the structure is maximal, that is, a portion of the highest floor, and thus, is often used for aerodynamic reinforcement of a novel structure and the existing structure in order to achieve the flexibility of a structure design and the ease of management thereof. The mass-type vibration control apparatus can be classified into a Tuned Mass Damper (TMD) corresponding to a passive type and an Active Mass Damper (AMD) corresponding to an active type. In particular, the AMD requires a third of mass of the passive type in order to achieve the same control effect, and many researches related to the AMD are thus being thus carried out. The AMD calculates control force according to a real-time control method on the basis of responses such as acceleration, velocity, and displacement generated in a structure by wind loads, and then generates the control force through driving a motor connected to a mass body. Currently, examples of a real-time control method for active control include continuous time domain techniques such as a Linear Quadratic Regulator (LQR) and a Linear Quadratic Gaussian (LQG), digital time domain techniques, frequency domain techniques such as $H_2$, and the like, in addition to a Bang-Bang control technique corresponding to a nonlinear control method.

The prior art documents 1 and 2 relate to analytic researches for active tendon systems in which the LQR method is applied to an one-degree-of-freedom system and a three-degree-of-freedom system. Thereafter, Chung (1989), Reinhorn (1989), and the like have applied the active control method to a model structure having six floors.

The prior art documents 3 and 4 relate to researches for control methods in which limitation of power and stroke of an actuator used during control are considered, and Gattuli and Soong have researched nonlinear control algorithm for increasing the efficiency of the active control system.

In the prior art document 5, it is identified, through comparison between the LQG corresponding to the time domain control method and the H2 corresponding to the frequency domain control method, that control force can be focused on a low frequency domain by a structure control through the H2 control method.

Active mass dampers to which the active control method was actually and initially applied were installed in Kyobashi Seiwa building in Japan in 1989. Two active mass dampers were installed to control vibrations generated by strong winds and earthquakes having general magnitudes, thereby improving the usability.

In Korea, a Hybrid Mass Damper (HMD) capable of active/passive control was installed in a control tower of the Incheon airport in 2000 with supports of a foreign active mass damper designing and manufacturing company, and the AMD was installed in L hotel in Ulsan in 2007. However, all the active control methods which were considered to be a core of the AMD were designed by foreign professional companies, and none of the AMD has been installed using the domestic individual technology.

Further, Korean Patent No. 1390502, which is an invention of the present applicant, discloses a multiple-degree-of-freedom active mass damper. However, contents related to effective calculation and control of control force are somewhat insufficiently.

PRIOR ART DOCUMENTS (Patent document 1) 1. Korean Patent No. KR 1390502 B1

(Non-Patent document 1) 1. Chung, L. L, Reinhorn, A. M. and Soong, T, T., Experiments on Active Control of Seismic Structures, Journal of Engineering Mechanics, ASCE, Vol. 144, 1988, pp. 241-256.

(Non-Patent document 2) 2. Chung, L. L, Lin, R. C., Soong, T. T., and Reinhorn, A. M., Experiments on Active Control for MDOF Seismic Structures, Journal of Engineering Mechanics, ASCE, Vol. 115, No. 8, 1989, pp. 1609-1627.

(Non-Patent document 3) 3. Tamura, K., Shiba, K., Inada, Y., and Wada, A. (1994). Control Gain Scheduling of a Hybrid Mass Damper System Against Wind Response of Tall Buildings. Proc. Of the First World Conference on Structural Control, FA2: 1322.

(Non-Patent document 4) 4. Gattulli, V. and Soong, T. T. (1994). Nonlinear Control Laws for Enhancement the Structural Control Effectiveness. Proc. $5^{th}$ U.S. National Conference on Earthquake Engineering, Chicago, Ill.

(Non-Patent document 5) 5. Gyeong won Min, Jin gu Kim, Seong chun Kim, Ran Jung, Research on comparison between active control algorithms according to weighting function, Collected paper, Vol. 14, No. 2, 2001, pp. 173-179 of Computational Structural Engineering Institute of Korea.

Accordingly, the present invention has been made in an effort to solve the above-mentioned problems, and provides a method for calculating optimal control force of an active mass damper using an input filter in order to improve control efficiency, and controlling the active mass damper, which is initially designed/manufactured using a domestic individual technology, and calculates optimal control force using a weighting function and a zero point calibration signal in the active mass damper so as to control the active mass damper.

SUMMARY OF THE INVENTION

In order to achieve the above aspects, a method for calculating optimal control force of an active mass damper and controlling the active mass damper according to the present invention includes: (a) sensing frequency and acceleration generated in a structure in real-time by a sensor; (b) calculating velocity and displacement by integrating the acceleration by an integral calculation module; (c) calculating, by a control force calculation module, the optimal control force using the calculated velocity, the calculated displacement, and a weighting function and a zero point calibration signal according to the displacement; and (d) controlling driving of an actuator according to the calculated optimal control force.

The method/system for calculating optimal control force of an active mass damper and controlling the active mass damper according to the present invention can control a flow phenomenon of a moving mass body by a weighting function and a zero point calibration signal, enable stable control at a zero point, and remove signals other than those in a control mode through a band pass filter, thereby accurately generating a control signal and achieving performance which can satisfy a control target for each mode.

BRIEF DESCRIPTION OF THE DRAWINGS

FIG. 4A is a graph depicting a weighting function for control force, and FIG. 4B is a graph depicting a change in a zero point calibration signal according to the velocity and the displacement;

DETAILED DESCRIPTION OF THE INVENTION

Figure 1:
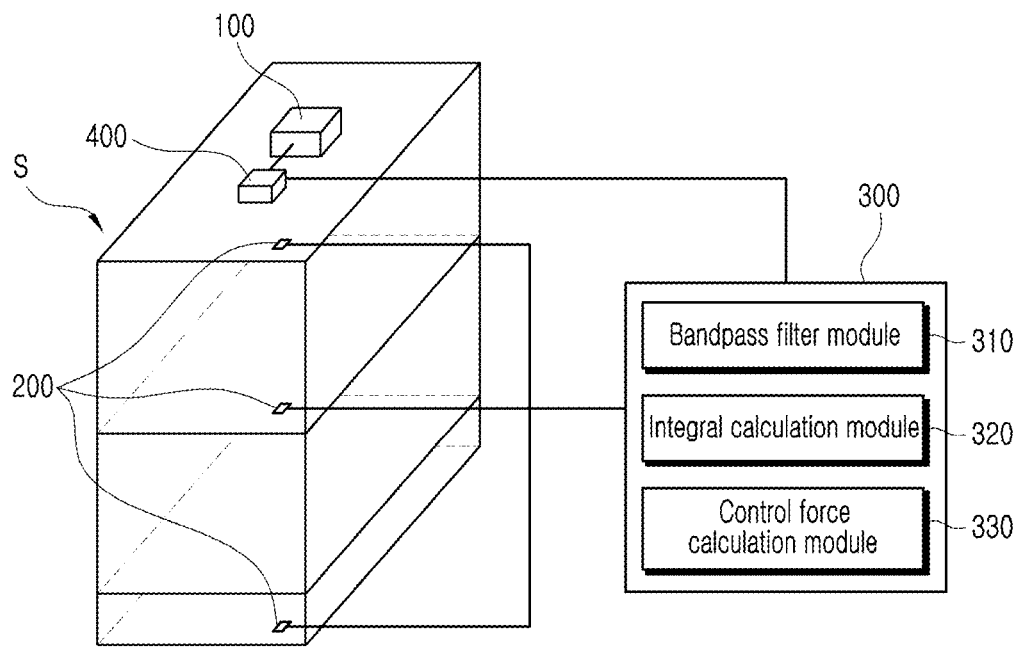
FIG. 1 is a schematic view illustrating a system for calculating optimal control force of an active mass damper and controlling the active mass damper according to an embodiment of the present invention.

Preferred embodiments of a method for calculating optimal control force of an active mass damper and controlling the active mass damper according to the present invention will be described with reference to FIGS. 1 to 14. In this process, the thicknesses of lines or the sizes of components, illustrated in the drawings, may be exaggeratedly illustrated for clarity and convenience of description. Further, terms which will be described are terms defined in consideration of functions in the present invention, which may be varied according to the intention of a user and an operator or customs. Therefore, the definition for such terms should be described on the basis of contents throughout the present specification.

Hereinafter, the method for calculating optimal control force of an active mass damper and controlling the active mass damper according to an embodiment of the present invention will be described with reference to FIGS. 1 to 14.

1. Description of System for Calculating Optimal Control Force of Active Mass Damper and Controlling Active Mass Damper First, a system for performing a method for calculating optimal control force of an active mass damper and controlling the active mass damper will be described.

The system for calculating optimal control force of an active mass damper and controlling the active mass damper according to the present invention includes an active mass damper 100, a sensor 200, a controller 300, and an actuator 400, as illustrated in FIG. 1.

The active mass damper 100 is installed in a structure S, and controls vibrations of the structure S by moving a mass body included in the active mass damper 100 through driving the actuator 400 connected to the active mass damper 100 on the basis of a structural response such as acceleration, velocity, and displacement generated in the structure S due to wind loads.

Figure 2:
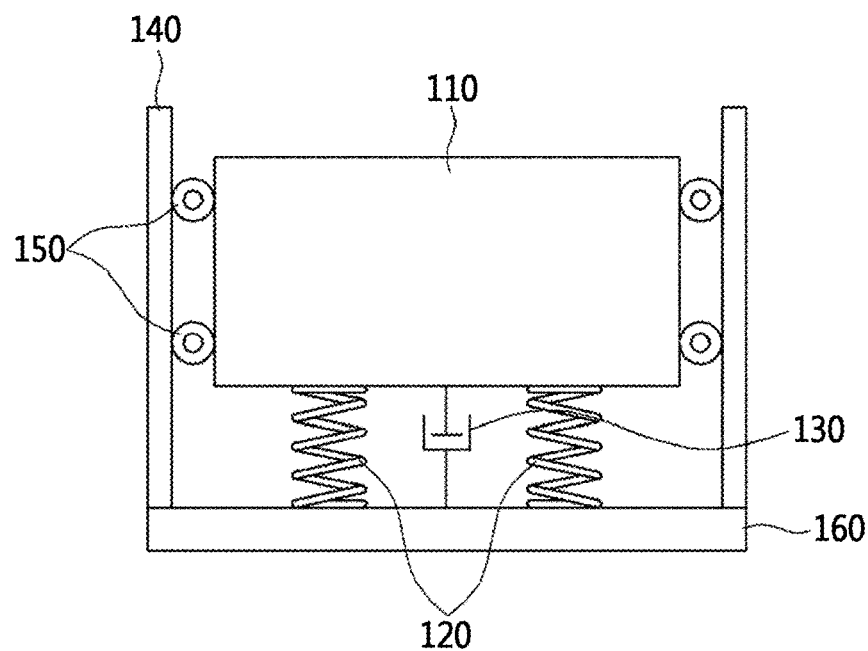
FIG. 2 is a schematic view illustrating the active mass damper according to the embodiment of the present invention.

As an example of the active mass damper 100, the active mass damper 100 as illustrated in FIG. 2 may include a frame 160, a guiderail 140, a roller 150, a mass body 110, an elastic body 120, and a damping body 130.

The mass body 110 is disposed on the frame 160 so as to vertically move through the guiderail 140 and the roller 150, and the elastic body 120 and the damping body 130 support the mass body 110 from below.

The frame 160 is fixed to the structure S, and when the structure S vibrates vertically, the mass body 110 absorbs vertical vibrations of the structure S while relatively vertically moving on the frame 160. Here, the elastic body 120 and the damping body 130 control the motion of the mass body 110, thereby effectively damping the vertical vibrations of the structure S.

Although an one-degree-of-freedom active mass damper for damping vertical vibrations of the structure S is exemplified as the above active mass damper 100, those skilled in the part can clearly understand, on the basis of the following description, that the above technology can be also applied to a multiple-degree-of-freedom active mass damper which can damp vertical and horizontal vibrations as well as horizontal vibrations. Since such active mass dampers are also widely known (Patent document 1), the detailed description of configurations itself of the dampers will be omitted.

The sensor 200 is installed in the structure S, and senses structural responses (frequency and acceleration) generated in the structure S.

The controller 300 is connected to the sensor 200, includes an integral calculation module 320 and a control force calculation module 330, and calculates optimal control force $V_{input}$ of the active mass damper 100. The detailed process will be described below.

The integral calculation module 320 calculates velocity and displacement by integrating the acceleration sensed by the sensor 200, and the integral calculation module 320 may be a Kalman filter, and removes an error of the sensed acceleration.

The Kalman filter can be applied when a state of the object at a specific time point has a linear relationship with a state of the object at a previous state and a probabilistic error in a measured value of an object. For example, the measured values of an object such as position, velocity, acceleration, may include errors. In this case, a position of the corresponding object can be assumed by the Kalman filter using values continuously measured.

The control force calculation module 330 calculates the optimal control force $V_{input}$ of the active mass damper 100 using the velocity and the displacement calculated by the integral calculation module 320 and additionally uses a weighting function $G_1$ and a zero point calibration signal $G_2$ according to the displacement when calculating the optimal control force $V_{input}$. This technology is one of core technical features of the present invention. The detailed description therefor will be described below.

The calculated optimal control force $V_{input}$ is input to the actuator 400 which will be described below, thereby controlling driving force of the actuator 400, and the movement distance (stroke) of the mass body 110 included in the active mass damper 100 is controlled according to the control of the driving force.

The actuator 400 is connected to the controller 300 and the active mass damper 100, and is driven according to the optimal control force $V_{input}$ input from the controller 300, thereby controlling the movement distance of the mass body 110.

2. Description of Method for Calculating Optimal Control Force of Active Mass Damper and Controlling Active Mass Damper Hereinafter, a method for calculating optimal control force of an active mass damper and controlling the active mass damper according to an embodiment of the present invention will be described in detail with reference to FIGS. 3 to 14 and experimental examples.

The active mass damper 100 (represented as an AMD in the drawings) is an apparatus which transfers inertial force obtained by multiplying mass of only a portion moving in a direction facing an object to be controlled among the entire mass of the active mass damper 100 by acceleration generated in the mass body 110 in the direction, thereby controlling vibrations of a structure, as represented by Equation (1).

$$f_{AMD} = -m_{AMD} A_{AMD} \quad (1)$$

In Equation (1), $f_{AMD}$ denotes inertial force, $m_{AMD}$ denotes mass of the active mass damper, and $A_{AMD}$ denotes acceleration of the mass body.

First, a sensor senses frequency and acceleration generated in a structure in real time (S100).

Next, an integral calculation module calculates velocity and displacement by integrating the acceleration, as represented by Equations (2) and (3) (S200).

$$V_{AMD} = \int_0^{t_f} A_{AMD} dt \quad (2)$$

$$D_{AMD} = \int_0^{t_f} V_{AMD} dt \quad (3)$$

In Equations (2) and (3), $A_{AMD}$ denotes acceleration of a mass body of an AMD, $V_{AMD}$ denotes velocity of the mass body of the AMD, and $D_{AMD}$ denotes displacement of the mass body of the AMD.

As in Equations (2) and (3), the acceleration $A_{AMD}$ is generated in the mass body of the active mass damper according to vibrations of the structure, the velocity $V_{AMD}$ and the displacement $D_{AMD}$ are generated by a result of integrating the acceleration. The driving of the actuator 400 and the size of the stroke of the guiderail 130, which are the most important parameters in controlling the active mass damper 100, respectively, are determined using the maximum velocity $v_{max}$ and the maximum displacement $d_{max}$ among the generated velocity $V_{AMD}$ and the generated displacement $D_{AMD}$. Such important parameters are sensed and calculated in real time, so that control is performed in real time.

Further, the calculating of the velocity $V_{AMD}$ and the displacement $D_{AMD}$ using the acceleration $A_{AMD}$ may be performed by applying not simple integration but the Kalman filer as described above, and the detailed description therefor will be described below through the experimental examples.

Next, the control force calculation module 330 calculates optimal control force $V_{input}$ of the active mass damper 100 using the velocity $V_{AMD}$, the displacement $D_{AMD}$, the weighting function $G_1$, and the zero point calibration signal $G_2$ (S300).

In the calculating of the optimal control force $V_{input}$ of the active mass damper 100, the most important factor is to ensure control performance while minimizing the mass of the mass body 110, the capacity of the actuator 400, and the movement distance (stroke) of the mass body 110.

However, the mass of the active mass damper 100 is minimized, acceleration should be increased in order to implement damping force having a desired size, and accordingly, the maximum velocity $v_{max}$ and the maximum displacement $d_{max}$ of the mass body 110 are increased, and thus, the capacity of the actuator 400 and the length of the guiderail 130 are increased in order to implement the increased maximum velocity $v_{max}$ and the increased maximum displacement $d_{max}$.

Thus, desired displacement may not be satisfied according to limitation of an installation space, and the movement distance of the mass body 110 may exceed the length of the guiderail 130 due to sensing and inputting of acceleration corresponding to the maximum displacement $d_{max}$ or larger.

In the present invention, in order to prevent such a control error, the weighting function $G_1$ according to the displacement of the mass body 110 and the zero point calibration signal $G_2$ for constant-velocity zero point calibration are applied to the optimal control force $V_{input}$ as represented by Equation (4).

$$V_{input} = G_1 V_{AMD} + G_2 \quad (4)$$

Figure 3:
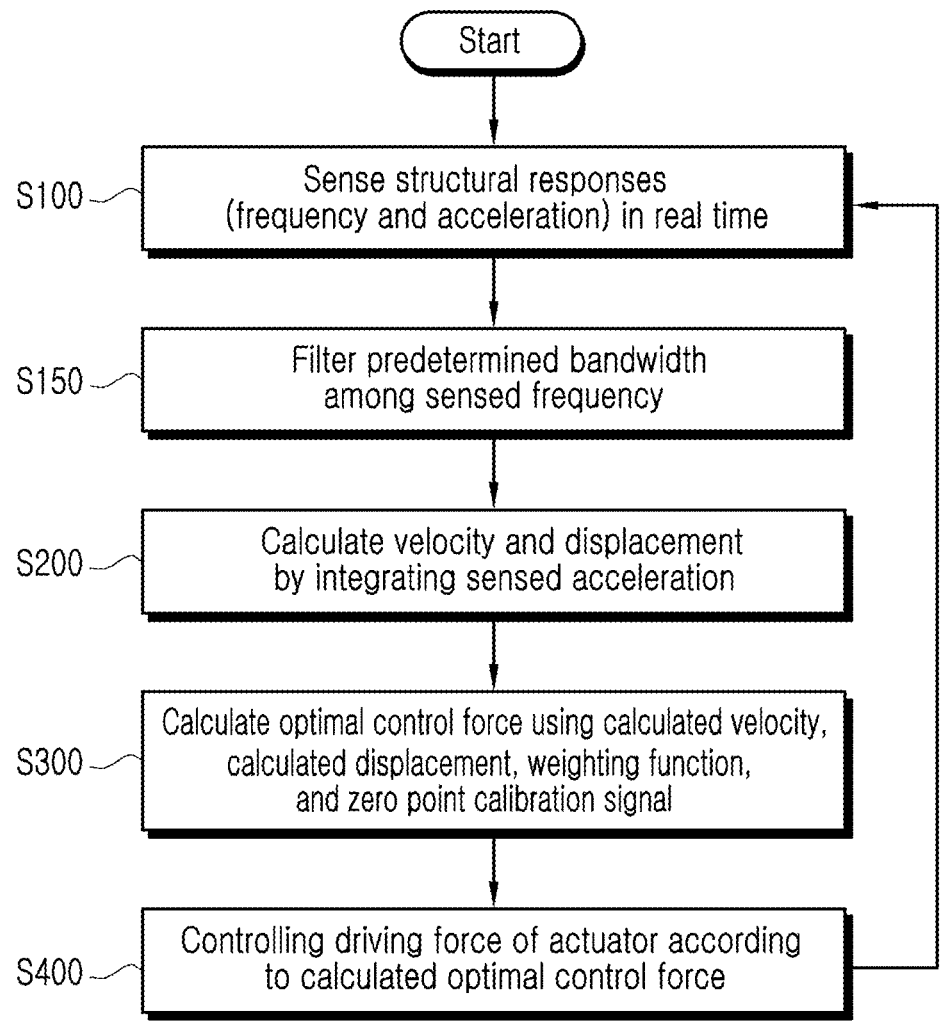
FIG. 3 is a flowchart illustrating a method for calculating optimal control force of an active mass damper and controlling the active mass damper according to the embodiment of the present invention.

A relationship between the displacement and the velocity applied to the active mass damper 100 through the weighting function $G_1$ and the zero point calibration signal $G_2$ is illustrated in FIG. 3.

In this way, as represented by Equation (5), the weighting function G1 is set to be a cosine function according to current displacement d(t) of the active mass damper 100, is a function input to a value of the velocity according to sections of the displacement, implements a calculated velocity value when $|d(t)|<d_{min}$, reduces the calculated velocity when $d_{min} \leq |d(t)| \leq d_{max}$, and makes the velocity value be zero when $|d(t)|>d_{max}$, thereby preventing the displacement of the mass body 110 from becoming equal to or larger than the limitation (maximum) displacement $d_{max}$. That is, the calculated velocity is varied according to the current displacement d(t) of the active mass damper 100 (see FIG. 3A).

$$G_1 = \begin{cases} 1 & |d(t)| < d_{min} \\ \cos\left(\frac{\pi}{2} \frac{|d(t)| - d_{min}}{d_{max} - d_{min}}\right) & d_{min} \leq |d(t)| \leq d_{max} \\ 0 & |d(t)| > d_{max} \end{cases} \quad (5)$$

The zero point calibration signal $G_1$ is an element for implementing sustained control force within an effective control range in the process of controlling the active mass damper 100, is an input velocity separate from the control velocity of the actuator 400 in order to allow the mass body 110 to move while returning to a zero point again when a predetermined constant movement distance is exceeded, and is represented by Equation (6).

$$V_o = \quad (6)$$
$$\begin{cases} (0.5v_{max}\cos(\pi d_{AMD}(t)/d_o) - 0.5v_{max})\text{sign}(d_{AMD}(t)) & \text{if}|d_{AMD}(t)| \leq d_o \\ \quad \ldots v_{max}\text{sign}(d_{AMD}(t)) & \text{otherwise} \end{cases}$$

In Equation (6), $v_{max}$ denotes the maximum velocity of the active mass damper 100 applied for zero point calibration, $d_o$ denotes a displacement boundary value of the active mass damper 100 to which the maximum velocity is applied, and d(t) denotes displacement of the active mass damper 100 at a current time point.

Figure 4A:
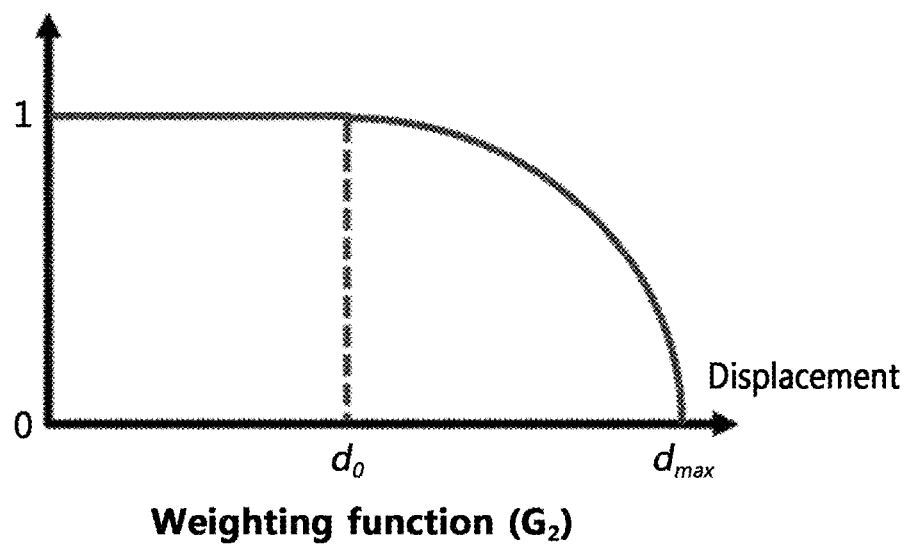
FIGS. 4A and 4B are graphs depicting a relationship between velocity and displacement of the active mass damper.
Figure 4B:
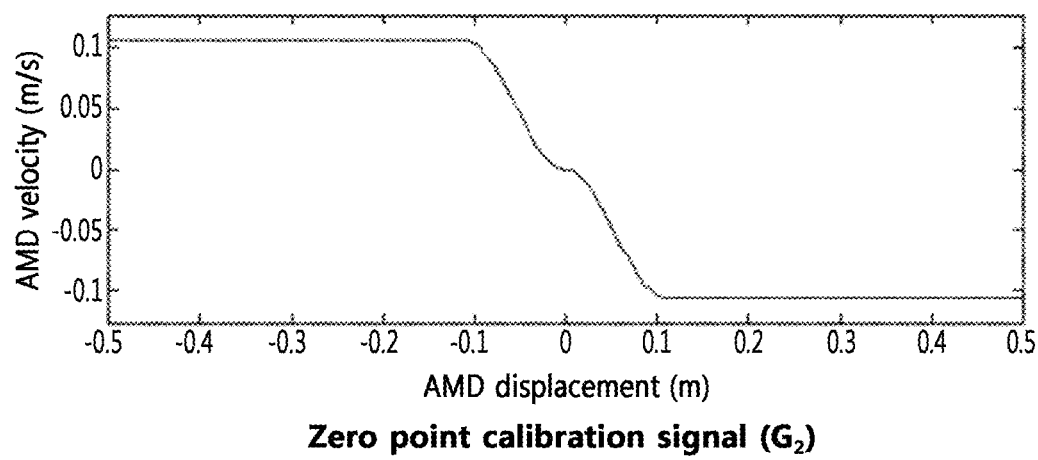

As illustrated in FIG. 4 and as represented by Equation (3), the velocity of the moving mass body 110 is zero when the active mass damper 100 is located at the zero point, is increased to the velocity of $v_{max}$ as the displacement of the active mass damper becomes closer to $d_0$, and becomes constant in a state in which the mass body 110 moves towards the zero point when the displacement exceeds $d_0$ (see FIG. 3B).

Next, the controller 300 controls driving of the actuator 400 according to the calculated optimal control force $V_{input}$ (S400).

Further, the controller 300 further includes a bandpass filter module 310, and the method further includes filtering only a predetermined bandwidth among the frequency sensed by the sensor 200 and inputting the filtered result to the integral calculation module 320, by the bandpass filter module 310 (S150).

In general, when the sensed frequency response is filtered, a digital filter using a post-processing technique through various numerical analysis programs is used, and the digital filter can perform filter application without errors of the size and the phase with regard to the desired frequency response. However, when control force is calculated by sensing the frequency response of the structure in real-time as in the active mass damper, a control signal can be accurately generated only when the sensed frequency response of the structure is input to the controller without a phase difference. Therefore, an analog filter which can minimize the phase difference and filter only a desired bandwidth should be applied. A butterworth filter is generally used as such an analog filter and is configured as represented by Equation (7), and the amplitude is almost flat in the passband so that there is no pulsation, and is reduced after the cut-off frequency. Further, a transition band, which is an intermediate region between the passband and the cut-off band, is determined according to an order of the filter as represented by Equation (7).

$$|H_N(j\omega)| = \frac{1}{\sqrt{1 + (\omega/\omega_o)^{2N}}} \quad (7)$$

In Equation (7), $|H_N(j\omega)|$ denotes an N-order function, and $w_0$ denotes a cut-off frequency.

<Experimental Example>

Hereinafter, an experimental example to which the method for calculating optimal control force of an active mass damper and controlling the active mass damper according to an embodiment of the present invention is applied will be described.

1) Outlines of Design and Installation of Active Mass Damper

In the present invention, a target structure in which the active mass damper is installed is a mixed use structure having 39 floors, which is a building having attracted large social concerns due to vibrations resulting from a vertical resonance phenomenon caused by collective rhythm exercise in 2011. As a result of a wind tunnel test performed in a step of investigating an accident reason for the target structure and a result of measuring, on the basis of AIJ-2004, the usability of a resident according to wind loads through field measurement of wind vibrations for the fifteenth typhoon "BOLAVEN" in 2012, the maximum acceleration is measured to be 12.04 cm/sec$^2$, which corresponds to the H-90 level of the Japanese residential performance guideline and is greatly larger than the H-70 level (6.32 cm/sec$^2$) corresponding to the usability limitation of a general office structure. Accordingly, installation of the active mass damper is determined to improve the usability of the resident by wind loads, and analytic researches for selecting a method for controlling the apparatus are carried out.

First, it is identified that the frequency in a first horizontal mode is 0.1907 Hz and the mode damping ratio is 1%, through a result of structural analysis and measuring vibrations during the typhoon. Accordingly, it is identified that, in order to reduce the maximum acceleration to the H-70 level of the Japanese residential performance guideline, which corresponds the usability limitation of the office structure, the acceleration should be reduced by 50% with regard to the generated response.

After target performance is set, in a step of determining whether a passive mass damper is used or an active mass damper is used, examination through a Tuned Mass Damper (TMD) corresponding to a passive type is initially carried out. The minimum required mass, which is identified through design for the TMD, is 104 ton (mass ratio is 1.1%), and is determined to be 120 ton in consideration of a safety factor. However, as a result of examining safety according to installation of a vibration control apparatus in an installation target structure, it is identified that the maximum installable mass without structure reinforcement is 80 ton. Therefore, the design is changed to using the AMD, and a related matter is represented by Table 1.

TABLE 1

| Control type | | Unidirectional active control |
|---|---|---|
| Mass of mass body [ton] | | 50 |
| Mass ratio [μ, %] | | 0.53 |
| Maximum stroke [mm] | | ±600 |
| Actuator (motor) | Capacity (kW) | 75 × 2 ea |
| | Maximum number of rotations (RPM) | 1500 |
| Effective damping ratio of structure by control [%] | | 3.83 |

2) Verification of Weighting Function $G_1$ and Zero Point Calibration Signal $G_2$ The experiment is carried out in an experiment building in a state in which, considering the length (±600 mm) of the guiderail 130 and the limit switch (±500 mm) of the active mass damper designed through the analysis, the limitation (maximum) displacement $d_{max}$ is set to be ±500 mm and other calibration values are set.

Figure 5A:
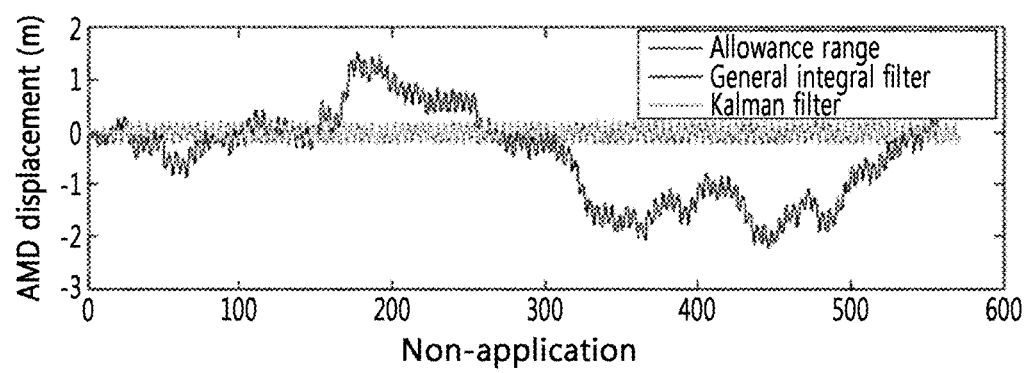
FIG. 5A is graph depicting the displacement of the active mass damper when the zero point calibration signal is not applied and FIG. 5B is graph depicting the displacement of the active mass damper when the zero point calibration signal is applied.

FIG. 5A illustrates the displacement of the active mass damper 100 when vibrations are controlled. When a general integral filter is used, it can be identified that the displacement is greatly increased, thus exceeds ±500 mm which is the limitation displacement $d_{max}$ of the active mass damper 100, and goes to −2000 mm or less.

Figure 5B:
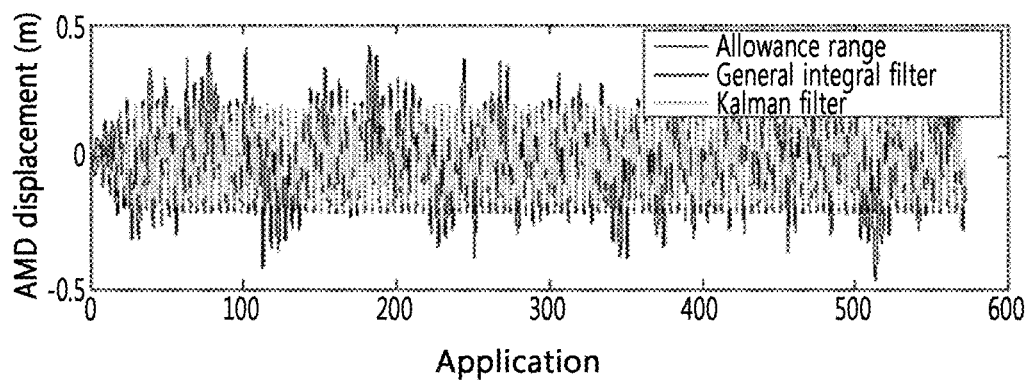

FIG. 5B illustrates the displacement of the active mass damper 100 when vibrations are controlled when the zero point calibration signal $G_2$ is applied. It is identified that the displacement of the active mass damper 100, which is greatly increased when the zero point calibration signal $G_2$ is not applied (FIG. 5A), is decreased, and thus, the active mass damper 100 is operated within ±500 mm which is the limitation displacement $d_{max}$.

On the basis of such a result, after the setting and calibration value is reflected to the controller, a control performance test is carried out. Here, in order to describe vibrations and an acceleration response of the structure, a pendulum having the natural frequency of 0.2 Hz is installed, and the sensor 200 is attached to the pendulum so as to sense vibrations and acceleration and input the sensed vibrations and the sensed acceleration to the controller 300.

In the setting for the weighting function $G_1$ and the zero point calibration signal $G_2$, which is input to the controller 300, the minimum displacement $d_{min}$, which is a variable of the weighting function $G_1$, is set to be 200 mm, and the limitation displacement $d_{max}$, which is a variable of the weighting function $G_1$, is set to be 300 mm. In order to examine the displacement according to whether the zero point calibration signal $G_2$ is input, the maximum velocity $v_{max}$ (0.01 m/sec) is input in a state in which the displacement is 200 mm, the boundary displacement $d_0$. Thereafter, the examination is carried out.

Figure 6A:
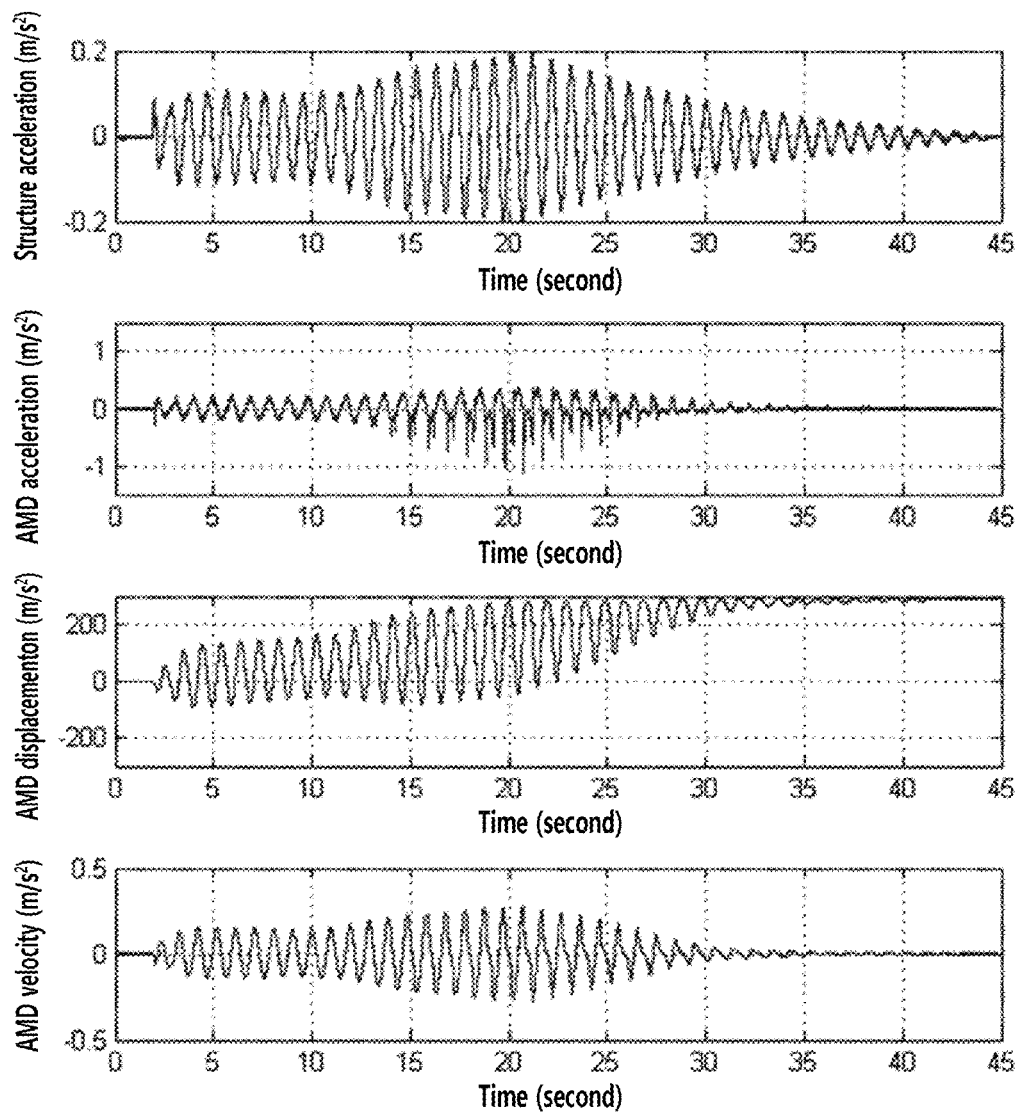
FIG. 6A is a graph depicting acceleration of a structure, and acceleration, displacement, and velocity of the active mass damper according to the application of the weighting function in a state in which the zero point calibration signal is not additionally applied.
Figure 6B:
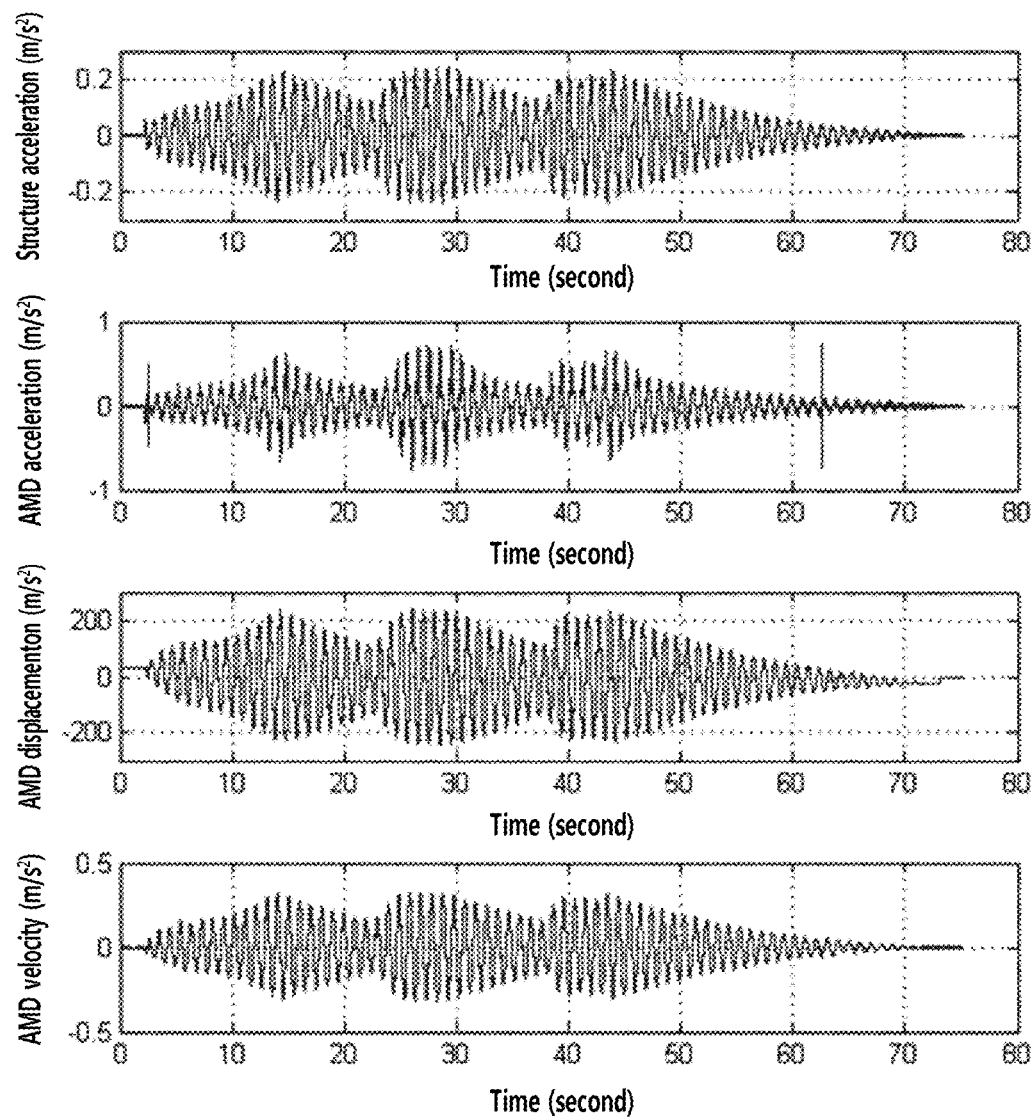
FIG. 6B is a graph depicting the acceleration of the structure, and the acceleration, the displacement, and the velocity of the active mass damper according to the application of the weighting function in a state in which the zero point calibration signal is additionally applied.

FIGS. 6A and 6B illustrate responses for acceleration of a structure, and the acceleration $A_{AMD}$, the displacement $D_{AMD}$, and the velocity $V_{AMD}$ of the active mass damper 100 through the experiment according to whether the calibration is carried out using the zero point calibration signal $G_2$. Since sweeping is individually applied through manpower, the waveform and the size of the input acceleration are different at every time. It can be identified in FIG. 6A that when the zero point calibration signal $G_2$ is not input, if the maximum acceleration 0.2 m/sec² is input, the displacement of the active mass damper is increased to +300 mm, and then does not exceed the limitation displacement $d_{max}$. However, it can be identified that when the displacement reaches the limitation displacement $d_{max}$ without inputting the zero point calibration signal $G_2$, even if input velocity is continuously generated, the displacement stays not more than the limitation displacement $d_{max}$ while not moving in an opposite direction, and acceleration is increased within a range of the minimum displacement $d_{min}$ to the limitation displacement $d_{max}$ according to the deceleration of the active mass damper. However, it can be identified in FIG. 6B that when all the weighting function $G_1$ and the zero point calibration signal $G_2$ are applied, the displacement of the active mass damper is averagely located at the zero point with regard to the input acceleration response. Further, it can be identified that the displacement does not become close to the limitation displacement $d_{max}$ of the weighting function $G_1$ by the zero point calibration signal $G_2$ so that the acceleration is not greatly increased.

Figure 7:
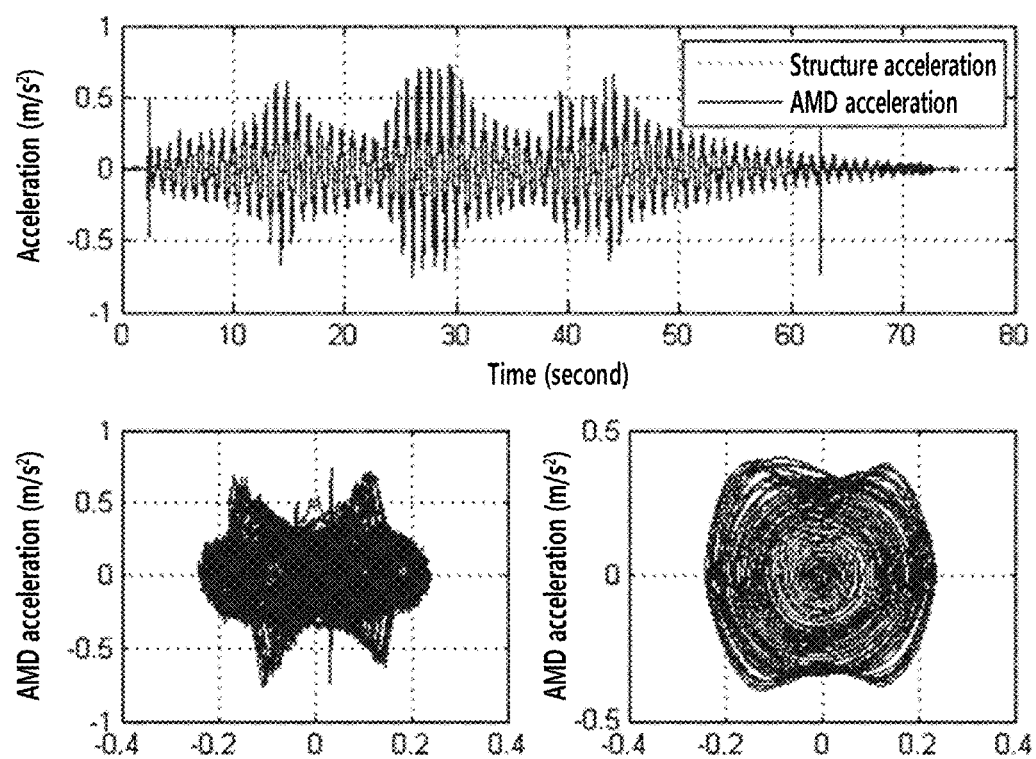
FIG. 7 is a graph depicting an acceleration response relationship between the structure and the active mass damper.

FIG. 7 illustrates a result obtained by comparing input acceleration with output acceleration of the active mass damper according to the weighting function $G_1$ and the zero point calibration signal $G_2$ illustrated in FIG. 6B. It can be identified in FIG. 7 that the input acceleration and the output acceleration according thereto accurately have a phase difference of 90 degrees.

3) Application and Experiment of Input Filter

After the active mass damper, for which the experiment is completed, is installed in a site (actual structure S), of a system for the structure is identified through the sine sweeping test using a sweeping function of the active mass damper, so that frequency, mass, and a damping ratio of an object to be controlled which are characteristics of each mode, are extracted.

TABLE 2

| | First mode | Second mode | Third mode |
|---|---|---|---|
| Mass (m, ton) | 22.500 | 22.515 | 9.634 |
| Frequency Experiment | 0.200 | 0.213 | 0.288 |
| (f, Hz) Analysis | 0.1907 | 0.2159 | 0.2859 |
| Damping ratio (ξ, %) | 1.4 | 1.6 | 1.3 |

Further, after a mode vector for a control mode is configured on the basis of the extracted mode characteristics, control experiment is performed by inputting the mode vector to the controller 300 responsible for actual control calculation.

In the first control experiment, a non-vibration-control experiment in which free vibration is performed after sweeping is performed through the active mass damper with regard to the three control modes identified in Table 2, and a vibration control experiment in which a mode is switched to a vibration control mode after the same sweeping are carried out. Here, in the weighting function $G_1$, the minimum displacement $d_{min}$ is set to be 300 mm, and the limitation displacement $d_{max}$ is set to be 500 mm. In the zero point calibration signal $G_2$, the maximum velocity $v_{max}$ is set to be 0.04 m/sec and the boundary displacement $d_0$ is set to be 300 mm.

Figure 8A:
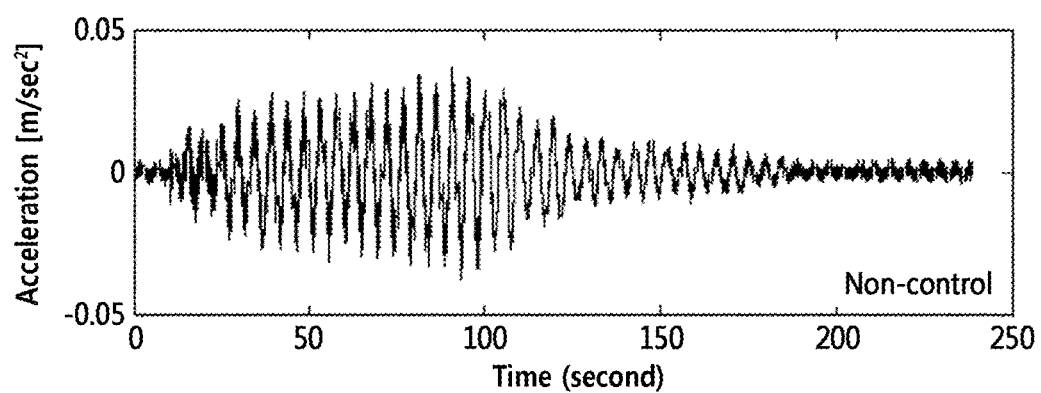
FIG. 8A is a graph depicting an acceleration response of the structure in (a) a non-control state in a second mode and FIG. 8B is a graph depicting an acceleration response of the structure in (a) a non-control state a control state in a second mode.
Figure 8B:
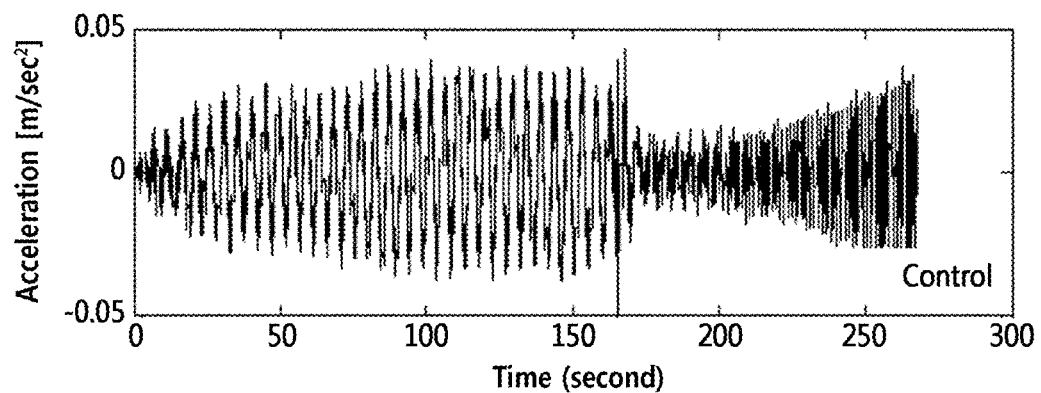

FIG. 8 illustrates an acceleration response for a structure obtained by the first control experiment for the frequency of 0.213 Hz which corresponds to the second mode. FIG. 8A is a graph depicting a result obtained by identifying a free-vibration state after sweeping is performed at the frequency of 0.213 Hz for 100 seconds using a sweeping mode of the active mass damper 100, and FIG. 8B is a graph depicting a result obtained by performing actual control through executing a vibration control mode after sweeping is performed at the same frequency for 160 seconds. As in the graph, it is identified that after control starts, the control is performed for the frequency of 0.213 Hz, vibrations are reduced in a moment, and the acceleration response of the structure is then amplified again After the experiment is completed, as a result obtained by analysing the frequency for a section in which the acceleration response is amplified by the active mass damper, it is identified that the controller 300 generates an input signal according to the response of the structure, exceeding a designed control mode range of the controller 300, and generates a signal for control therefor, but the control phase for frequency of the designed range or higher does not become 90 degrees, so that sweeping is performed.

Figure 9A:
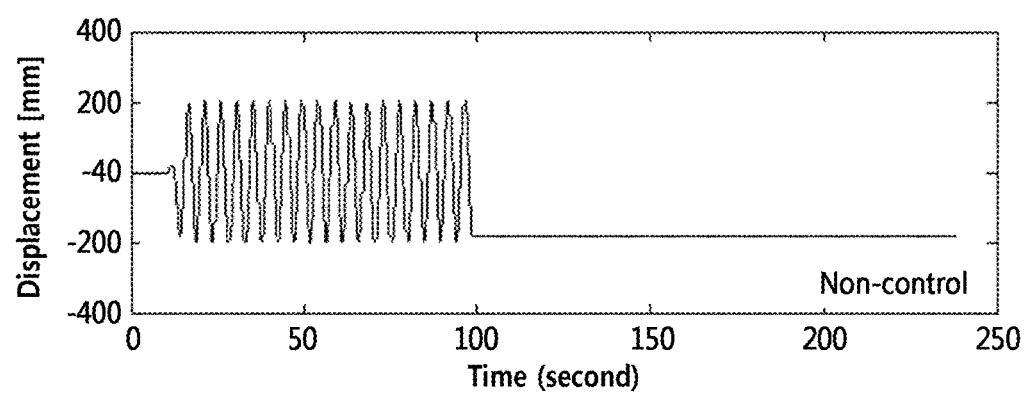
FIG. 9A is a graph depicting the displacement of the active mass damper in the non-control state in the second mode and FIG. 9B is a graph depicting the displacement of the active mass damper in the control state in the second mode, which is identical to FIG. 7.
Figure 9B:
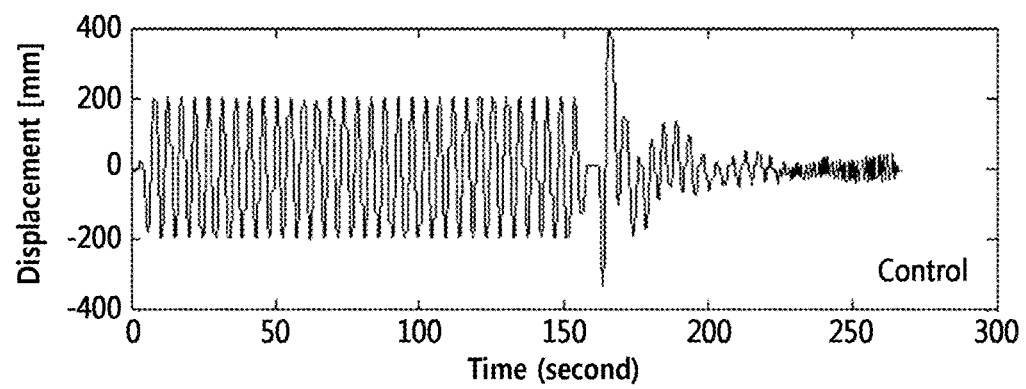

FIG. 9 illustrates a displacement history in the same control experiment, and is a result obtained by examination by applying the weighting function $G_1$ and the zero point calibration signal $G_2$. As in the drawing, it can be identified that the sweeping displacement of the active mass damper 100 is 200 mm, and thus, the sweeping is performed constantly, and as in FIG. 9A, it can be identified that, in non-control, there is no movement displacement after the sweeping is terminated. In FIG. 9B, it can be identified that after sweeping is performed for 160 seconds, the mass body 110 returns to an initial position according to a mode change, the displacement of maximally 400 mm is generated as soon as control starts, and the displacement is greatly reduced. However, it can be identified that movement corresponding to the limitation displacement $d_{max}$ or larger is not generated due to the weighting function $G_1$, and control is performed with reference to the zero point even in a control section.

It is identified through system identification that there is a mode of 0.676 Hz in addition to the three control mode identified after the first control experiment. However, it is determined that when the controller 300 performs a control through the additional mode, the control efficiency is reduced, and thus, the bandpass filter module 310 is designed in an input stage as a way for preventing sweeping of the corresponding mode.

As described above, in order to design the bandpass filter module 310 using the butterworth filter, the bandpass filter module 310 performs filtering for the structure response sensed in the first control experiment. First, an order N of the filter determining the width of the transition band is set to be 1, the frequency range of 0.2 Hz to 0.6 Hz is filtered at an interval of 0.01 through designing the low pass filter for the sensed response, a phase difference between an actual response and the response after the filtering is identified. Thereafter, the cut-off frequency of the high pass filter is reduced from 0.18 Hz to 0.01 Hz, and the phase difference is then identified.

Figure 10A:
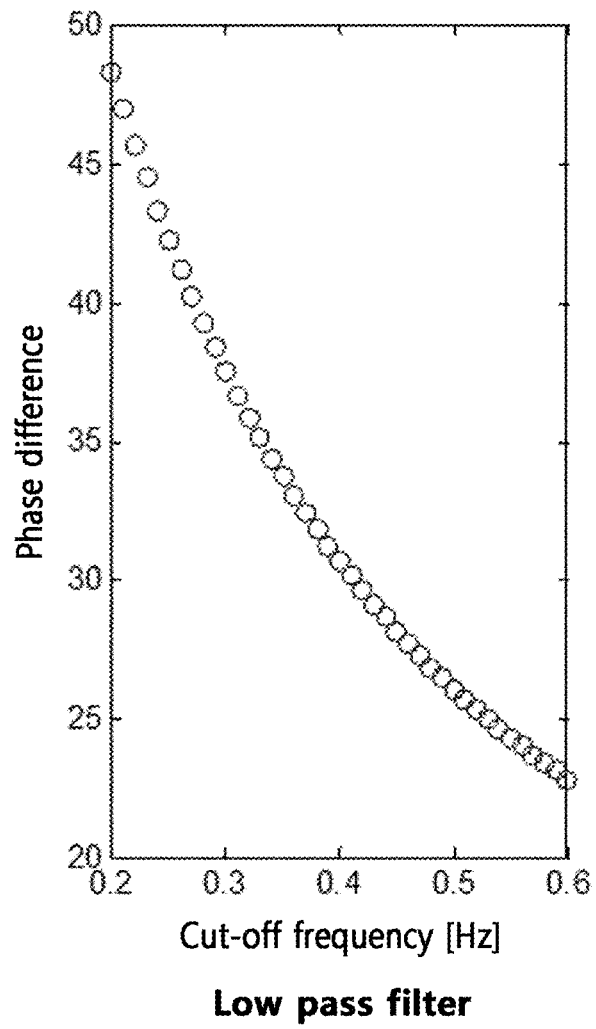
FIG. 10A is a graph depicting a phase difference according to a filtering bandwidth in a low pass filter and FIG. 10B is a graph depicting a phase difference according to a filtering bandwidth in a high pass filer.
Figure 10B:
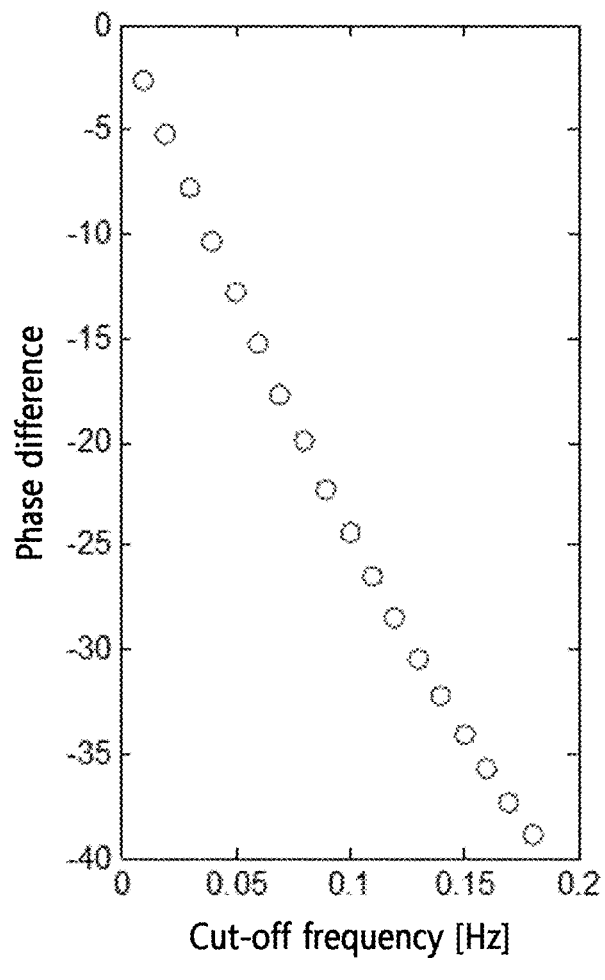

FIG. 10 illustrates a phase difference between the response sensed according to the low pass filter and the high pass filter and the response for each filter section. It can be identified that, in the low pass filter, the phase difference is reduced as the cut-off frequency is increased, and in contrast, it can be identified that, in the high pass filter, the phase difference is reduced as the cut-off frequency is reduced. Considering the phase difference occurring according to the filtering method, the range of the low pass filter and the cut-off frequency by which the phase difference becomes zero by the high pass filter are selected, and the phase differences according thereto are compared with each other.

Figure 11:
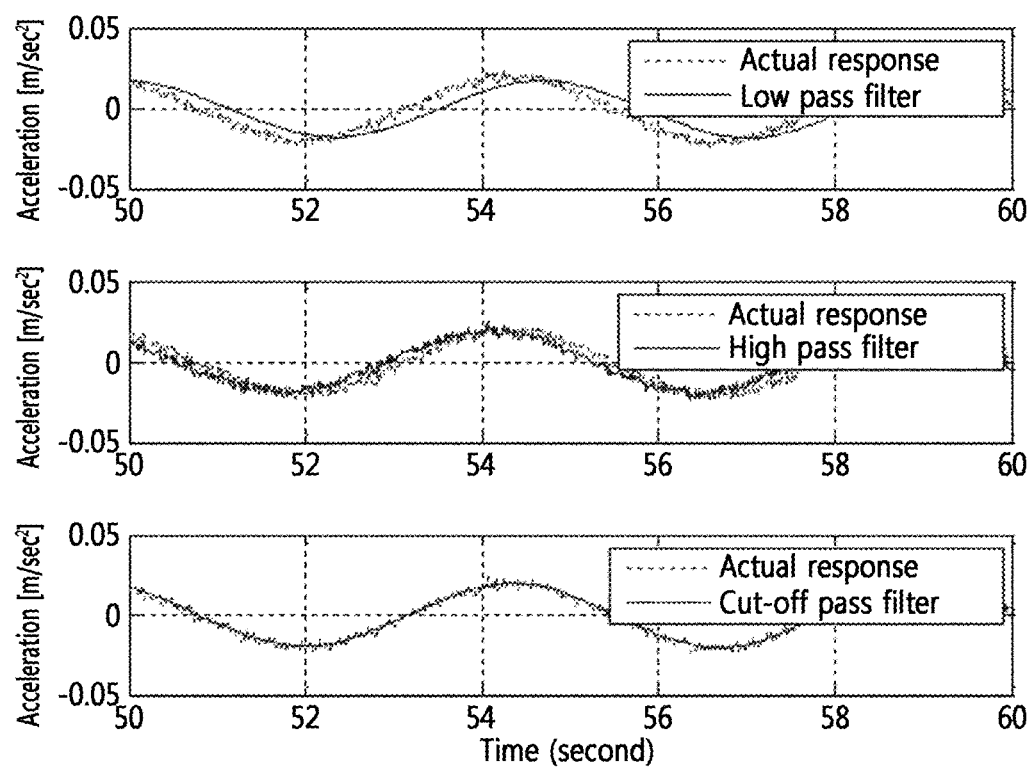
FIG. 11 is a graph depicting results of filtering the structural response, which correspond to results of the low pass filter, the high pass filter, and a cut-off pass filter.

FIG. 11 illustrates a result for each filtering with regard to the structural response and a result of the bandpass identified by selecting the cut-off frequency in which the phase difference is zero, in the control for 0.213 Hz in the first measurement result. As illustrated in FIG. 11, it can be identified that in the low pass filter, a response is formed later than an actual response, and in the high pass filter, the response is formed earlier than the actual filter. It can be identified that in a filter using the cut-off frequency of each filter as a band thereof, a filtered response is generated in which there is no error with regard to the actual response.

Figure 12:
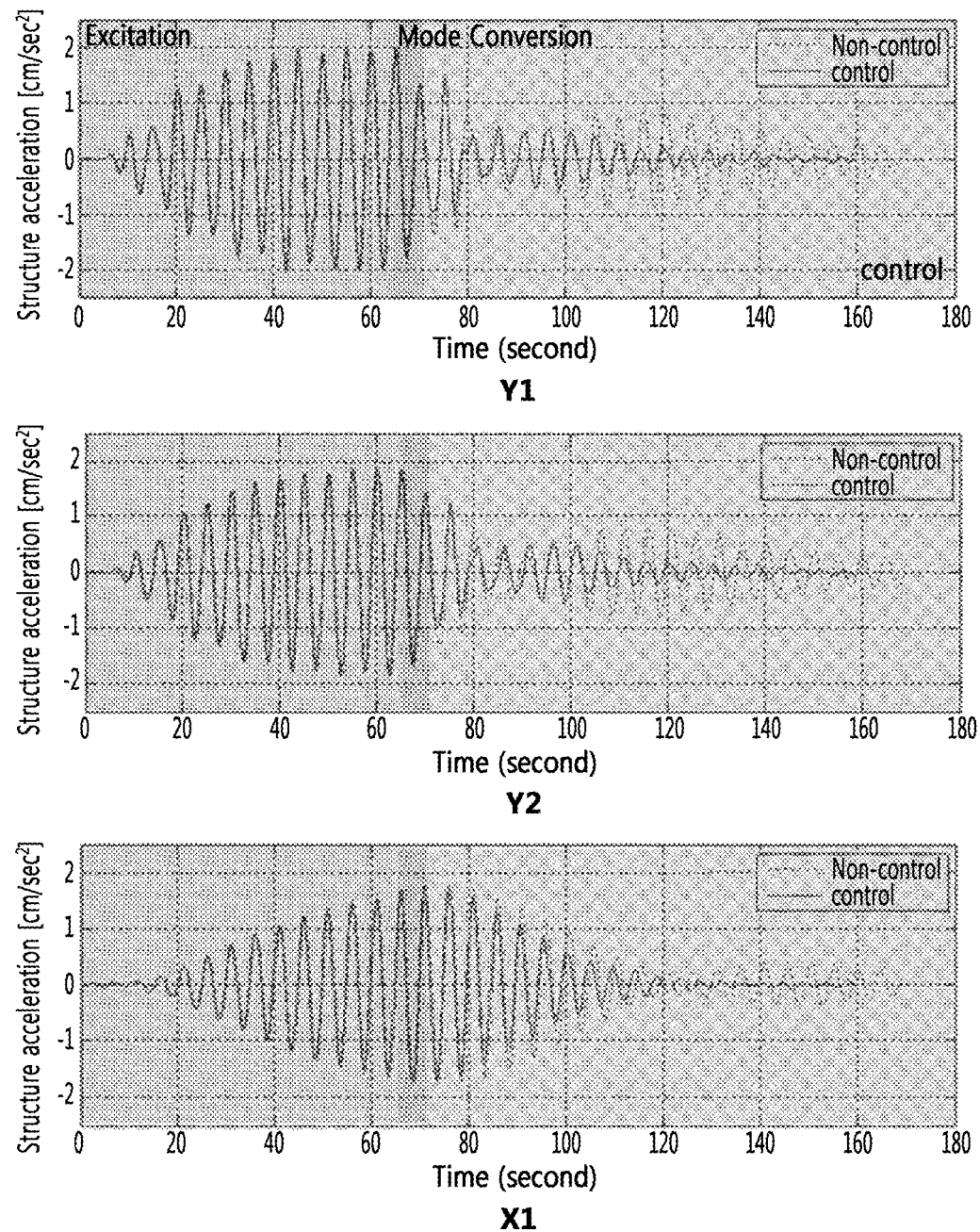
FIG. 12 is a graph depicting the structural response in a first mode.
Figure 13:
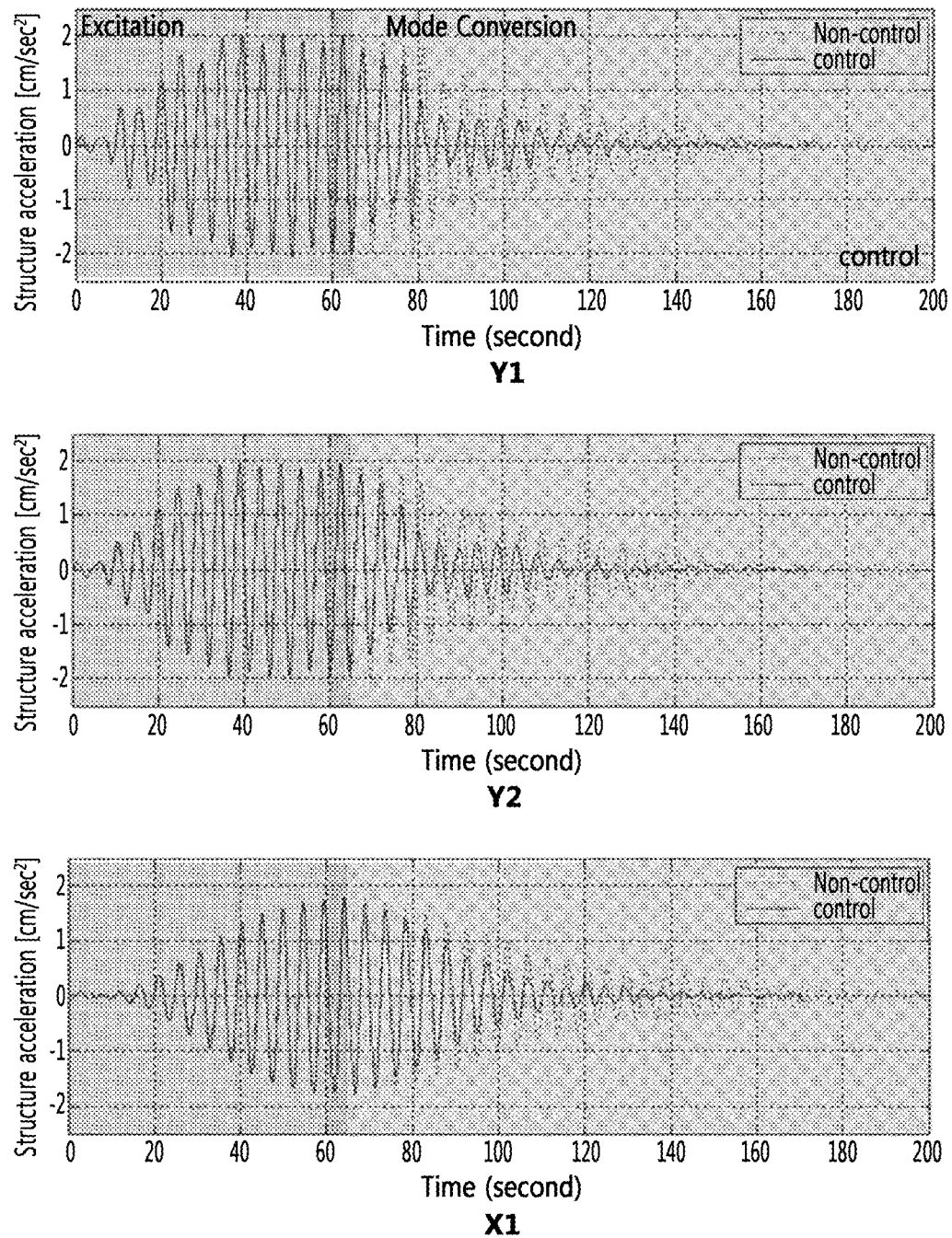
FIG. 13 is a graph depicting the structural response in the second mode.
Figure 14:
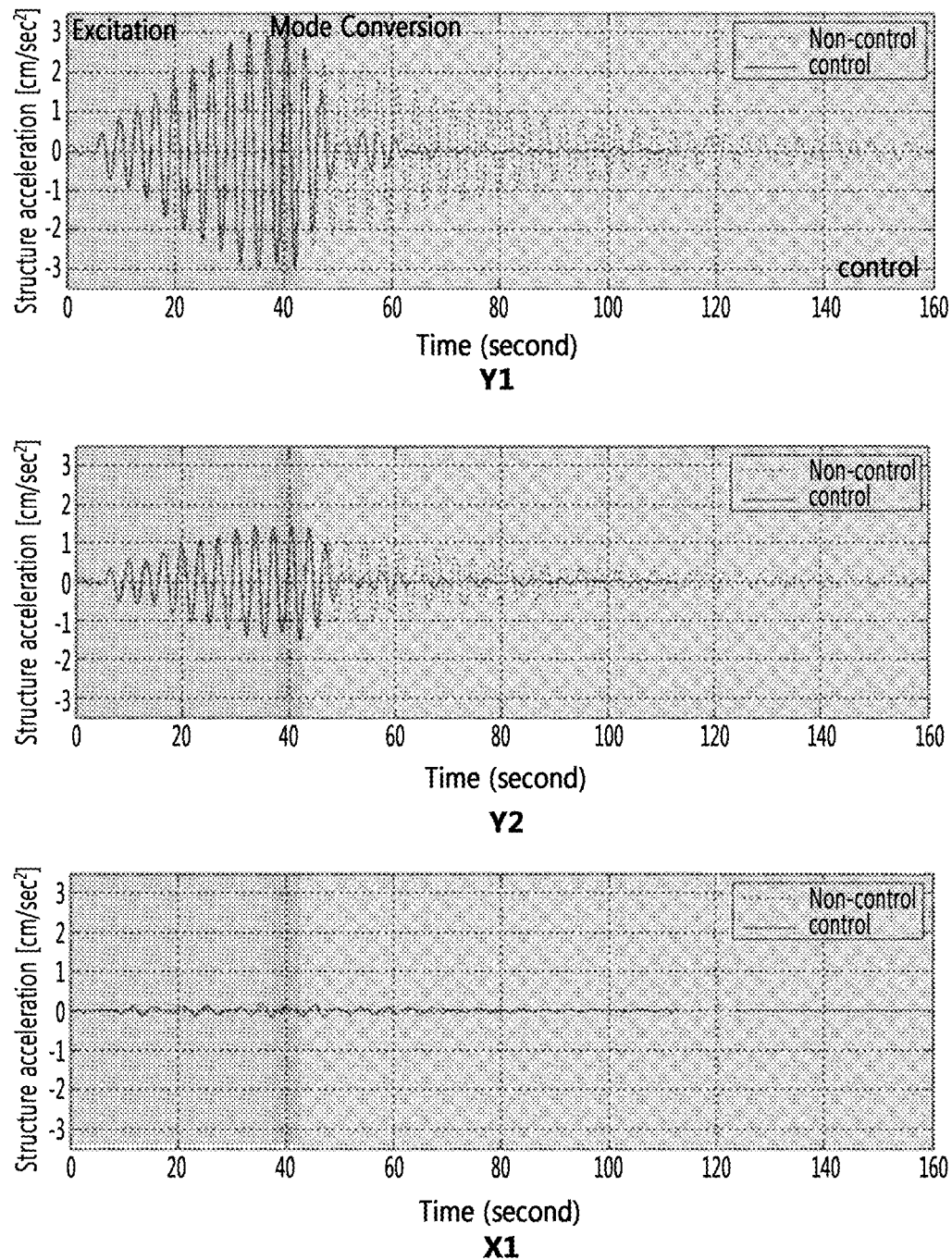
FIG. 14 is a graph depicting the structural response in a third mode.

After the bandpass filter module 310 is configured and input is completed, a second control experiment result for the three performed control mode is illustrated in FIGS. 12 to 14 while being classified into responses in directions of short sides Y1 and Y2 and a long side X1 of the structure S. In order to accurately examine control performance, the response of 0.676 Hz, the frequency in which the vibration amplitude is generated in the first experiment, is included in the second control experiment, and processing of the low pass filter having a band of 0.7 Hz is performed.

FIG. 12 illustrates a response of the structure S in each direction in non-control/control for the first mode (0.200 Hz). It can be identified that after the sweeping is terminated, the responses of the short sides Y1 and Y2 are identically reduced by the control mode. It can be identified that after the response of the long side X1 is generated after 10 seconds from the start of the sweeping, and the response is increased even after the sweeping.

FIG. 13 illustrates a control result for the second mode (0.213 Hz). It can be identified that, in the non-control mode, the response lasts for 10 seconds even after the sweeping is terminated, and is then reduced, but when the control is performed, the responses in the directions of the short sides Y1 and Y2 are continuously reduced as soon as the control starts, and are then reduced by 50% or more in a free vibration section. In the response in the direction of the long side X1, vibrations are reduced similar to the first mode control, but the reduced amount of response is larger than that of the first mode control.

FIG. 14 illustrates a control result for the third mode. It can be identified that, dissimilar to the first and second modes, the magnitudes of the maximum accelerations of the responses in the directions of the short sides Y1 and Y2 are different and there is few responses in the direction of the long side X1. This fact represents that the third mode is a rotation mode according to the center of the mass. Accordingly, it is represented that the response of the short side Y2 closer to the center of the mass is smaller than the response of the short side Y1. Further, since the third mode is the rotation mode in the direction of the short sides, vibrations in the direction of the long side are not generated, so that it is determined that there is few responses of the long side X1.

A vibration control effect has a tendency that control is performed within two cycles, and corresponds to a control effect much larger than those of the first and second modes. A ratio of a mode participation mass to the mass of the vibration control apparatus is much smaller than those of the first and second modes, so that the large control effect can be obtained.

A time history for the control effect for each control mode is identified, and a damping ratio for each mode is extracted using the algebra reduction method on the basis of the free vibration response according to the control, and is represented in Table 3. The damping ratios for the modes are 1.4%, 1.6%, and 1.3% before the control, and are increased to 4.6%, 5.3%, and 6.7% after the control, respectively.

TABLE 3

| | Damping ratio (%) | | |
|---|---|---|---|
| | First mode | Second mode | Third mode |
| Non-control | 1.4 | 1.6 | 1.3 |
| Control | 4.6 | 5.3 | 6.7 |

As described above, the method for calculating optimal control force of an active mass damper and controlling the active mass damper according to the present invention can control the flow phenomenon of the moving mass body by the weighting function and the zero point calibration signal, and enable stable control at a zero point, and remove signals other than those in the control, thereby accurately generating a control signal and achieving performance which can satisfy a control target for each mode.

Although the above description has been made with reference to the preferred embodiments of the present invention, it can be understood that those skilled in the art can modify and change the present invention without departing from the spirit and the scope of the present invention described in the following appended claims.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for calculating optimal control force of an active mass damper and controlling the active mass damper, the method comprising:

(a) sensing frequency and an acceleration response ($A_{AMD}$) generated in a structure (S) in real time by a sensor, wherein the frequency and the acceleration response are structural responses;

(b) calculating velocity ($V_{AMD}$) and displacement ($D_{AMD}$) of the active mass damper by integrating the acceleration response by an integral calculation module;

(c) calculating an optimal control force ($V_{input}$) using the calculated velocity ($V_{AMD}$), the calculated displacement ($D_{AMD}$), and a weighting function ($G_1$) and a zero point calibration signal ($G_2$) according to the calculated displacement ($D_{AMD}$), by a control force calculation module, wherein calculating of the optimal control force ($V_{input}$) is performed by a first equation, $$V_{input} = G_1 V_{AMD} + G_2,$$

wherein the weighting function ($G_1$) is calculated by a second equation, $$G_1 = \begin{cases} 1 & |d(t)| < d_{min} \\ \cos\left(\frac{\pi}{2} \frac{|d(t)| - d_{min}}{d_{max} - d_{min}}\right) & d_{min} \leq |d(t)| \leq d_{max} \\ 0 & |d(t)| > d_{max} \end{cases},$$

wherein, in the second equation, d(t) denotes current displacement of the active mass damper, $d_{min}$ denotes minimum displacement of the active mass damper, and $d_{max}$ denotes limitation displacement of the active mass damper, and wherein the velocity ($V_{AMD}$) is varied according to a change in the current displacement of the active mass damper; and (d) controlling drive of an actuator according to the calculated optimal control force ($V_{input}$).

2. The method of claim 1, wherein the integral calculation module uses a Kalman filter.

3. The method of claim 2, wherein in the step (b), the calculating of the velocity ($V_{AMD}$) and the displacement ($D_{AMD}$) are performed by third and fourth equations, $$V_{AMD} = \int_0^{tf} A_{AMD} dt, \text{and}$$

$$D_{AMD} = \int_0^{tf} V_{AMD} dt.$$

4. The method of claim 1, further comprising, between the steps (a) and (c), filtering only a predetermined bandwidth among the sensed frequency by a bandpass filter module.

5. The method of claim 4, wherein the bandpass filter module is an analog filter, and is designed by a butterworth designing scheme, and the predetermined bandwidth is calculated by a third equation, $$|H_N(j\omega)| = \frac{1}{\sqrt{1 + (\omega/\omega_o)^{2N}}}$$

wherein, in the third equation, $|H_N(j\omega)|$ denotes an N-order function, and $w_0$ denotes a cut-off frequency.

6. The method of claim 1, wherein the steps are repeatedly performed.

7. A method for calculating optimal control force of an active mass damper and controlling the active mass damper, the method comprising:

(a) sensing frequency and an acceleration response ($A_{AMD}$) generated in a structure (S) in real time by a sensor, wherein the frequency and the acceleration response are structural responses;

(b) calculating velocity ($V_{AMD}$), and displacement ($D_{AMD}$) of the active mass damper by integrating the acceleration response by an integral calculation module;

(c) calculating an optimal control force ($V_{input}$) using the calculated velocity ($V_{AMD}$), the calculated displacement ($D_{AMD}$), and a weighting function ($G_1$) and a zero point calibration signal ($G_2$) according to the calculated displacement ($D_{AMD}$), by a control force calculation module, wherein the calculating of the optimal control force ($V_{input}$) is performed by a first equation, $$V_{input} = G_1 V_{AMD} + G_2,$$

wherein the zero point calibration signal ($G_2$) is calculated by a second equation, $$V_o = \begin{cases} (0.5v_{max}\cos(\pi d_{AMD}(t)/d_o) - 0.5v_{max})\text{sign}(d_{AMD}(t)) & \text{if } |d_{AMD}(t)| \leq d_o \\ \ldots v_{max}\text{sign}(d_{AMD}(t)) & \text{otherwise} \end{cases},$$

and wherein, in the second equation, $v_{max}$ denotes maximum velocity of the active mass damper applied for zero point calibration, $d_0$ denotes a displacement boundary value of a vibration control apparatus to which the maximum speed is applied, and d(t) denotes displacement of the active mass damper at a current time point; and (d) controlling drive of an actuator according to the calculated optimal control force ($V_{input}$).

8. The method of claim 7, wherein the integral calculation module uses a Kalman filter.

9. The method of claim 8, wherein in the step (b), the calculating of the velocity ($V_{AMD}$) and the displacement ($D_{AMD}$) are performed by third and fourth equations, $$V_{AMD} = \int_0^{tf} A_{AMD} dt, \text{ and}$$

$$D_{AMD} = \int_0^{tf} V_{AMD} dt.$$

10. The method of claim 7, further comprising, between the steps (a) and (c), filtering only a predetermined bandwidth among the sensed frequency by a bandpass filter module.

11. The method of claim 10, wherein the bandpass filter module is an analog filter, and is designed by a butterworth designing scheme, and the predetermined bandwidth is calculated by a third equation, $$|H_N(j\omega)| = \frac{1}{\sqrt{1 + (\omega/\omega_o)^{2N}}}$$

wherein, in the third equation, $|H_N(j\omega)|$ denotes an N-order function, and $w_0$ denotes a cut-off frequency.

12. The method of claim 7, wherein the steps are repeatedly performed.

* * * * *